United States Patent
Daly et al.

(10) Patent No.: US 9,424,192 B1
(45) Date of Patent: Aug. 23, 2016

(54) PRIVATE MEMORY TABLE FOR REDUCED MEMORY COHERENCE TRAFFIC

(71) Applicant: International Business Machines Corporation, Armonk, NY (US)

(72) Inventors: David M. Daly, Croton on Hudson, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/677,342

(22) Filed: Apr. 2, 2015

(51) Int. Cl.
*G06F 12/00* (2006.01)
*G06F 12/08* (2016.01)

(52) U.S. Cl.
CPC .... *G06F 12/0817* (2013.01); *G06F 2212/1008* (2013.01); *G06F 2212/151* (2013.01); *G06F 2212/251* (2013.01)

(58) Field of Classification Search
None
See application file for complete search history.

(56) References Cited

U.S. PATENT DOCUMENTS

| | | | |
|---|---|---|---|
| 7,853,755 B1 | 12/2010 | Agarwal et al. | |
| 8,364,851 B2 | 1/2013 | Kessler et al. | |
| 8,370,584 B2 | 2/2013 | Cantin et al. | |
| 2008/0109624 A1 | 5/2008 | Gilbert et al. | |
| 2010/0115236 A1* | 5/2010 | Bataineh | G06F 9/52 712/29 |
| 2010/0332771 A1 | 12/2010 | Gray et al. | |
| 2011/0055515 A1* | 3/2011 | Khubaib | G06F 12/0831 711/207 |
| 2011/0060879 A1 | 3/2011 | Rogers et al. | |
| 2012/0226868 A1 | 9/2012 | Ceze et al. | |
| 2012/0317369 A1 | 12/2012 | Beers et al. | |
| 2013/0097385 A1 | 4/2013 | Beckmann et al. | |
| 2013/0185522 A1 | 7/2013 | Moga et al. | |
| 2014/0040562 A1* | 2/2014 | Koka | G06F 12/10 711/141 |

FOREIGN PATENT DOCUMENTS

| | | |
|---|---|---|
| JP | 2012093857 A | 5/2012 |
| KR | 1020070057532 A | 6/2007 |
| WO | WO99/26144 | 5/1999 |
| WO | WO2011/031969 A1 | 3/2011 |

OTHER PUBLICATIONS

List of IBM Patents or Patent Applications Treated as Related, 2 pages.
List of IBM Patents or Patent Applications Treated as Related (Appendix P), 2 pages.
Agarwal, Anant et al., "An Evaluation of Directory Schemes for Cache Coherence", 15th Annual International Symposium on Computer Architecture, May 30-Jun. 2, 1988, pp. 280-289.

(Continued)

*Primary Examiner* — David X Yi
*Assistant Examiner* — Craig Goldschmidt
(74) *Attorney, Agent, or Firm* — Stephen J. Walder, Jr.; Jennifer R. Davis

(57) ABSTRACT

A mechanism is provided for memory coherence in a multiple processor system. Responsive to a memory operation from a processing core of the multiple processor system resulting in a cache miss, the mechanism checks a private region table associated with the processing core. The memory operation attempts to access a memory region. Responsive to determining the memory region corresponds to an entry in the private region table, the mechanism performs a remote memory controller snoop of a remote memory controller without snooping the multiple processor system.

14 Claims, 4 Drawing Sheets

(56) References Cited

OTHER PUBLICATIONS

Alisafaee, Mohammad, "Spatiotemporal Coherence Tracking", The 45th Annual IEEE/ACM International Symposium on Microarchitecture, (MICRO'12), Vancouver, BC, Canada, Dec. 1-5, 2012, 10 pages.

Cantin, Jason F. et al., "Coarse-Grain Coherence Tracking: RegionScout and Region Coherence Arrays", Micro, IEEE, Volume. 26, Issue No. 1, Jan.-Feb. 2006, pp. 70-79.

Cuesta, Blas et al., "Increasing the Effectiveness of Directory Caches by Deactivating Coherence for Private Memory Blocks", Proceedings of the 38th Annual International Symposium on Computer Architecture (ISCA '11), San Jose, CA, USA, Jun. 4-8, 2011; 11 pages.

Hardavellas, Nikos et al., "Reactive NUCA: Near-Optimal Block Placement and Replication in Distributed Caches", Proceedings of the 36th Annual International Symposium on Computer Architecture (ISCA '09), Austin, TX, Jun. 2009, 12 pages.

Moshovos, Andreas, "RegionScout: Exploiting Coarse Grain Sharing in Snoop-Based Coherence", The 32nd Annual International Symposium on Computer Architecture, ISCA '05, Madison, WI, USA, Jun. 4-8, 2005, 12 pages.

Shaogang, Wang et al., "Optimizing Private Memory Performance by Dynamically Deactivating Cache Coherence", 2012 IEEE 14th International Conference on High Performance Computing and Communications, Liverpool, UK, Jun. 25-27, 2012, 6 pages.

\* cited by examiner

PRIVATE MEMORY TABLE FOR REDUCED MEMORY COHERENCE TRAFFIC

BACKGROUND

The present application relates generally to an improved data processing apparatus and method and more specifically to mechanisms for a private memory table for reduced memory coherence traffic.

Cache coherence, also referred to as memory coherence, is an issue that affects the design of computer systems in which two or more processors or cores share a common area of memory. In a single processor system, there is only one processing element doing all the work and, therefore, only one processing element that can read to or write from a given memory location. As a result, when a value is changed, all subsequent read operations of the corresponding memory location will see the updated value, even if it is cached.

Conversely, in multiprocessor (or multicore) systems, there are two or more processing elements working at the same time, and so it is possible that they simultaneously access the same memory location. Provided none of the processors changes the data in this location, the processor can share the data indefinitely and cache the data as it pleases. But as soon as a processor updates the location, the other processors might work on an out-of-date copy that may reside in its local cache. Consequently, some scheme is required to notify all the processing elements of changes to shared values; such a scheme is known as a "cache coherence protocol," and if such a protocol is employed the system is said to have "cache coherence."

The exact nature and meaning of the cache coherency is determined by the consistency model that the coherence protocol implements. In order to write correct concurrent programs, programmers must be aware of the exact consistency models that are employed by their systems. When implemented in hardware, the coherency protocol can be directory-based or employ snooping. Examples of specific protocols are the MSI protocol and its derivatives MESI, MOSI and MOESI.

Protocols incorporated in hardware have been developed to maintain cache coherence. Many multiprocessor systems maintain cache coherence with a snoopy protocol. This protocol relies on every processor or memory controller monitoring (or "snooping") all requests to memory. Each cache or memory independently determines if accesses made by another processor require an update. Snoopy protocols are usually built around a central bus (a snoopy bus). Snoopy bus protocols are very common, and many small-scale systems utilizing snoopy protocols are commercially available.

Alternatively, to maintain cache coherence across the system, a directory-based protocol uses a directory that contains memory-coherence control information. The directory, usually part of the memory subsystem, has an entry for each main memory location with state information indicating whether the memory data may also exist elsewhere in the system. The directory-based coherence protocol specifies all transitions and transactions to be taken in response to a memory request. Any action taken on a memory region, such as a cache line or page, is reflected in the state stored in the directory.

In addition, the system's memory is much larger than the total data present in the caches. The directory-based coherence protocol tracks only memory regions (cache lines) that are present in one or more caches, and does not have any information on the data that is present only in the memory. The absence of information in the directory implies that the data is not present in the cache.

SUMMARY

In one illustrative embodiment, a method is provided for cache coherence in a multiple processor system. The method comprises checking a private region table associated with a processing core responsive to a memory operation from the processing core of the multiple processor system resulting in a cache miss. The memory operation attempts to access a memory region. The method further comprises performing a remote memory controller snoop of a remote memory controller without snooping the multiple processor system responsive to determining the memory region corresponds to an entry in the private region table.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
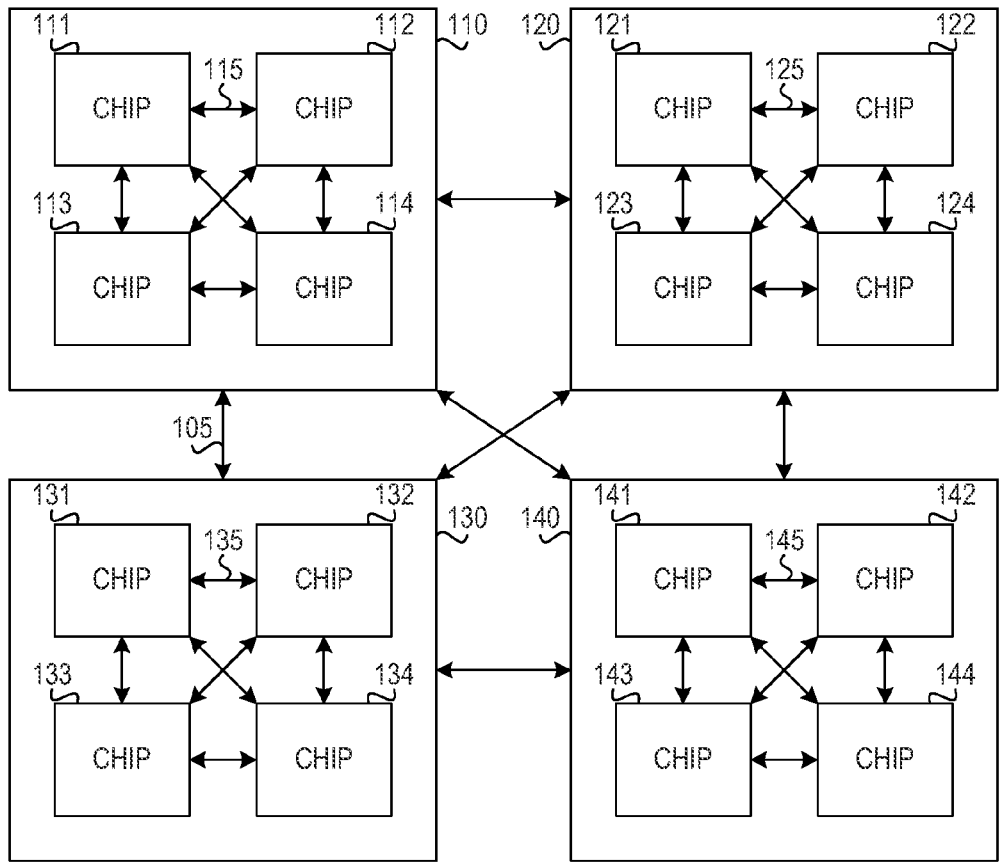
FIG. 1 is an example diagram of a multiple processor data processing system in which aspects of the illustrative embodiments may be implemented.

The illustrative embodiments provide mechanisms for a private memory table for reduced memory coherence traffic. The overhead of managing memory coherence in computer servers grows with the size of the system. Current multiple processor data processing systems, such as Power® computer systems, use snoopy-based protocols. Above a certain system size, snoopy protocols no longer scale due to bandwidth demands, and the bandwidth requirements of the directory-based coherence protocols scales better than snoopy protocols. Replacing the current snoopy protocols with a directory-based protocol would be expensive. Also, a memory coherence directory may become very large as it scales with larger multiple processor systems.

The illustrative embodiments provide mechanisms for identifying regions of memory that will not be shared but are not local to the processor using that memory. The mechanisms allow the processor to circumvent the normal coherence overhead for accessing remote memory when accessing that memory region, while ensuring memory coherence is maintained.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
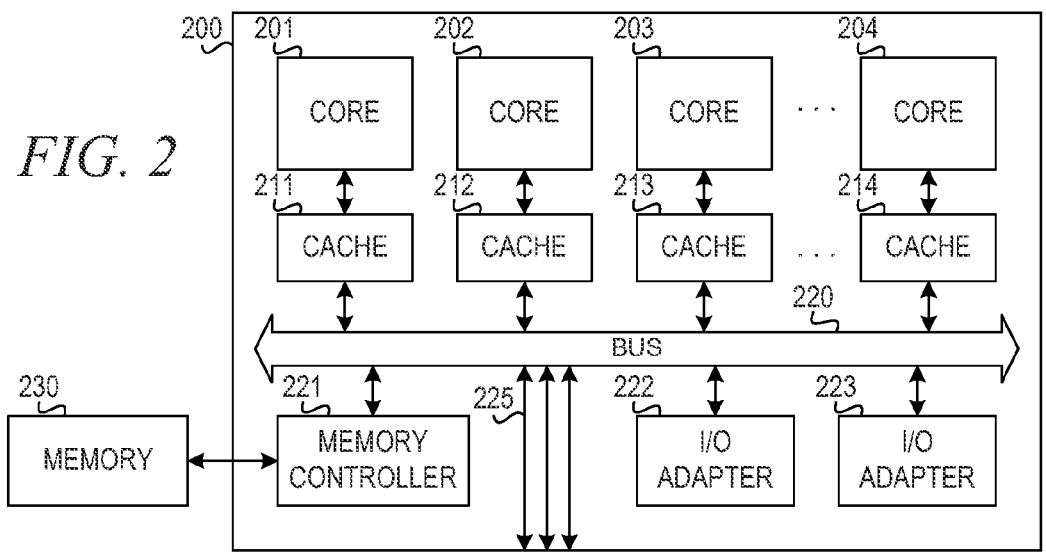
FIG. 2 is an example block diagram of a data processing system chip in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example multiple processor data processing system in which aspects of the illustrative embodiments may be implemented. Data processing system 100 may include a network of computers in which aspects of the illustrative embodiments may be implemented. Data processing system 100 contains nodes 110, 120, 130, 140, each node connected to each other node 110-140 by buses 105, which may include connections, such as wire, wireless communication links, or fiber optic cables.

In the depicted example, each node includes a plurality of chips containing one or more processors or cores. For instance, node 110 has chips 111-114, each connected to each other chip 111-114 by buses 115; node 120 has chips 121-124, each connected to each other chip 121-124 by buses 125; node 130 has chips 131-134, each connected to each other chip 131-134 by buses 135; and, node 140 has chips 141-144, each connected to each other chip 141-144 by buses 145.

While the depicted example has four nodes, each having four chips, a multiple processor system may include more or fewer nodes or chips depending upon the implementation. In the depicted example, each chip may have eight processor cores, resulting in 128 processors. However, a multiple processor system may include more cores per chip or more chips per node, and the multiple processor system may include more nodes. In one example embodiment, nodes may be combined into books, resulting in thousands or even tens of thousands of processors.

FIG. 2 is a block diagram of an example data processing system chip in which aspects of the illustrative embodiments may be implemented. In the depicted example, data processing system chip 200 is a system-on-a-chip in which a plurality of processor cores 201-204 are connected to system bus 220 via caches 211-214. Data processing system 200 includes memory controller 221 and input/output (I/O) adapters 222, 223 connected to bus 220. Memory controller 221 provides access to memory 230. I/O adapters may be combinations of I/O controllers, such as Ethernet, serial attached SCSI (SAS), or peripheral component interconnect express (PCIe) controllers, for example. Buses 225 provide connections to other chips or nodes.

An operating system runs on one or more of processing cores 201-204. The operating system coordinates and provides control of various components within the data processing system 200 in FIG. 2. An object-oriented programming system, such as the Java™ programming system, may run in conjunction with the operating system and provides calls to the operating system from Java™ programs or applications executing on data processing system 200. As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors.

Instructions for the operating system, the object-oriented programming system, and applications or programs are located on storage devices (not shown), and may be loaded into main memory 230 for execution by processing cores 201-204. The processes for illustrative embodiments of the present invention may be performed by processing cores 201-204 using computer usable program code, which may be located in a memory such as, for example, memory 230, for example.

A bus system, such as buses 105, 115 as shown in FIG. 1, may be comprised of one or more buses. Of course, the bus system may be implemented using any type of communication fabric or architecture that provides for a transfer of data between different components or devices attached to the fabric or architecture. A communication unit, such as a modem or network adapter (not shown), may include one or more devices used to transmit and receive data. A memory may be, for example, main memory 230 or a cache such as caches 211-214 in FIG. 2.

In one embodiment, each core 201-204 and its associated cache 211 make up a "chiplet." For instance, processing core 201 may have an L1 cache (not shown), and cache 211 may be an L2 cache. The POWER8™ processor by IBM includes combinations of 4, 6, 8, 10, or 12 chiplets per chip. The chip 200 may also include one L3 cache (not shown) that is shared by all chiplets on chip 200. Chip 200 may also have access to an off-chip L4 cache memory (not shown).

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Figure 3:
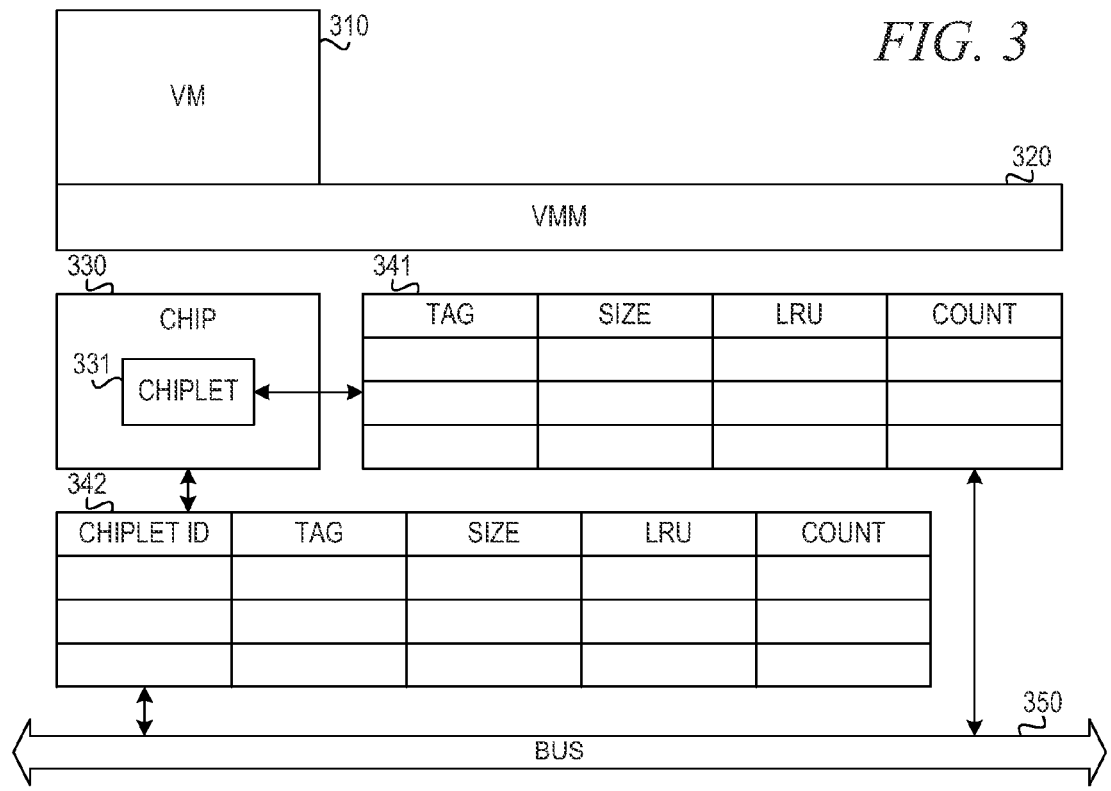
FIG. 3 depicts a mechanism for using a private region table to reduce memory coherence traffic in accordance with an illustrative embodiment.

FIG. 3 depicts a mechanism for using a private region table to reduce memory coherence traffic in accordance with an illustrative embodiment. Virtual machine (VM) 310, also referred to as a logical partition, requests remote data through virtual machine manager (VMM) 320, also referred to as a hypervisor. VMM 320 maintains a private region table (PRT) 341 per processing core (or chiplet) 331 and a chip-level PRT 342 per chip 330. PRT 341 and chip-level PRT 342 provide directed remote memory access to regions of memory that are private to VM 310 but located remotely. When VMM 320 allocates remote memory (i.e., memory that is not local to chiplet 331 or chip 330) to VM 310, VMM 320 creates an entry in PRT 341 and chip-level PRT 342.

In one embodiment, VMM 320 performs a data cache block zero and invalidate (DCBZI) operation on the whole memory region before placing the memory in the free pool. The VMM 320 clears (zeros) the memory after it is freed from a processor a partition. Current techniques require bringing the data into the cache to clear; however, the data is not immediately used, which leads to cache pollution. In this embodiment, VMM 320 implements an instruction to zero a line of memory and invalidate the line from caches. If the cache line is in the local caches, then it is invalidated. Then, the command is sent out on the system bus, and all processing cores treat the command as a data block invalidate. The memory controller or lowest point of coherence (LPC) also accepts the command. The LPC treats the command as a write of all zeros. Additionally, the command resets any coherence scope information. The end state of the DCBZI operation is that the line of memory is all zero and only exists on its home location (e.g., dynamic random access memory (DRAM) on the dual in-line memory module (DIMM)).

In one embodiment, the VMM 320 creates a PRT entry if the memory controller directory (MCD) entry indicates that the memory region is node contained. Each node has local memory, and all the nodes have access to the full memory (local and remote (belonging to another node)). VMM 320 performs virtualization and maps memory addresses to the physical devices.

If node A accesses remote memory (i.e., memory attached to node B) and if the corresponding memory controller directory (MCD) entry for that memory region indicates that the region is node contained, it implies that all cache lines belonging to that memory region will be present, if at all, only in the caches of node B, and the caches of the rest of the system need not be snooped at all for any cache line in that memory region. Therefore, checking for the presence of all the cache lines in that memory region within only the caches of node B will indicate whether any of the cache lines of that memory region is present in any of the caches of node B. This mechanism is referred to as a "node walk." On the other hand, if the MCD entry does not indicate that the memory region is node-contained, then all the caches in the entire system (i.e., all the nodes) will have to be searched to determine if any of them have any cache lines belonging to this memory region. This mechanism is referred to as "system pump." A node walk of the memory region is expensive but not as inefficient to doing a system pump for each line in the memory region.

In one embodiment, the PRT 341 includes a cache line count to track the number of cached lines present for each region in the PRT. The chip-level PRT 342 also tracks the same information as the chiplet-level PRT 341. The chip-level PRT 342 is the victim PRT, which holds the PRT entries replaced from the chiplet-level PRT 341 due to space constraints. This allows the VMM 320 to free an entry in the PRT when there are no longer any cache lines present in the memory region, which enables replacement with a new entry in the PRT.

Each entry in PRT 341, which is associated with chiplet 331, includes a tag (an address of the memory region tracked by the PRT entry), a size (a region can be 1 KB, 2 KB, or even a whole page), least recently used (LRU) information, and a count. The size is needed if variable size regions are supported. The LRU field tracks the time the PRT entry was last referenced. The LRU (least recently used) field is used to choose an entry for replacement from the PRT in order to accommodate a new entry. The count indicates the number of cache lines in the region in the local cache. PRT 341 may also include a VM identifier (VM ID) (or logical partition identifier (LPAR ID)) or process ID when more than one VM or process is associated with chiplet 331.

Chip-level PRT 342 receives castouts from the chiplet PRT 341. When the chiplet-level PRT 341 runs out of space, an entry (example LRU entry) is cast out and is saved in the chip-level PRT. The chip-level PRT 342 adds a chiplet ID field to identify the chiplet to which the memory region is associated. The chip-level PRT is a second level table that holds the castout entries from all the chiplet-level PRTs of that chip. Thus, the combination of chiplet-level and chip-level PRT must be searched to determine if the remote region is private. In general, in embodiments with both a chiplet-level PRT and a chip-level PRT, the combination of chiplet-level PRT and chip-level PRT may be referred to as the PRT.

If chip-level PRT 342 runs out of space, the LRU field is used to choose an entry of chip-level PRT 342 to be cast out. In one embodiment, the entry may be cast out to a node-level PRT (not shown). Alternatively, the entry may simply be removed and the memory region may no longer considered "private" for the purposes of the mechanisms of the illustrative embodiments. In this case, the mechanism may perform a system pump as if the memory region were not private.

When a processor, such as the processing core in chiplet 331, performs a memory operation that results in a cache miss, the processor checks PRT 341 to determine if the memory being accessed is part of a private remote memory region. If checking the PRT 341 results in a hit, i.e., there is an entry in PRT 341 for the memory region, the processor sends a remote memory controller snoop. There is no need to snoop the rest of the remote chip or the rest of the system, because the memory being accessed is private to VM 310 and there are no other processors sharing the memory region. If checking PRT 341 results in a miss, i.e., there is no entry in PRT 341 for the memory region, the processor performs the memory operation using snoopy coherence protocol.

A mechanism snoops bus 350 looking for invalidate notifications to invalidate a PRT entry. Thus, if another processor performs a memory operation that results in a memory region no longer being private to VM 310, the mechanism invalidates a corresponding entry PRT 341. The PRT snoop may be performed by logic associated with PRT 341, the processor in chiplet 331, VMM 320, or a background thread executing in VM 310. In an alternative embodiment, the mechanism may split the entry into parts and invalidate only a part of the memory region. For example, each entry may include a bitmask, wherein each bit in the bitmask indicates whether a portion of the memory region is private or not. For example, the memory region may be a page, and the bitmask may include a bit for each cache line in the page. When all cache lines in the page are invalidated and all bits in the bitmask are asserted (or de-asserted depending upon the implementation), then the PRT entry can be invalidated.

The PRT 341 installs only under software control. If an entry is evicted or invalidated from PRT 341, there is no hardware based path to reinstall. The system attempts to achieve data locality; therefore, most partitions will use local memory. Only a few partitions need to use the PRT 341 and can spill to the chip-level table 342. Partitions using the PRT may still have local memory regions and may still access remote memory that is not private.

Virtual machines may be migrated from one core to another core. If a VM migration takes place, it is important not to lose PRT entries. The system may use a period of sharing in which the two cores access the same PRT. In one embodiment, the VMM migrates PRT entries/memory through dynamic random access memory (DRAM). The VMM performs a data cache block flush of all cache lines in all regions for the VM, flushing (writing) the cache lines back to DRAM. The VMM then migrates the PRT entries to the new core (chiplet) or node.

In an alternative embodiment, the VMM migrates PRT entries/memory directory from core to core. The VMM sets a flag on all PRT entries for the VM being migrated. The VMM installs the memory regions to the PRT of the new core with the flag set. The VMM then picks a memory region to migrate. From the old core all the cache lines (if present in the cache) belonging to the region being migrated will have to be moved to the new core. This mechanism is referred to as a region walk. The VMM issues a data cache block move to cache to inject the data into the new core. When done walking the region, the VMM invalidates the PRT entry in the first core and clears the flag in the new core. The processor snoops the new core and the home memory controller on a cache miss when the flag is set. The VMM does not invalidate PRT entries on the original core for remote access from the new core. The VMM invalidates PRT entries on the original core for local, non-DCBM access to the memory region.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
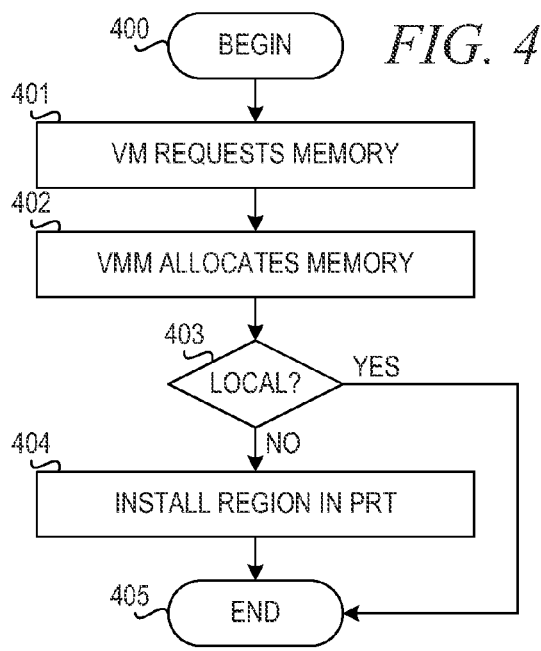
FIG. 4 is a flowchart illustrating operation of a mechanism for managing a private region table in accordance with an illustrative embodiment.

FIG. 4 is a flowchart illustrating operation of a mechanism for managing a private region table in accordance with an illustrative embodiment. Operation begins (block 400), and a virtual machine requests memory (block 401). The virtual machine manager allocates the memory to the virtual machine (block 402). The virtual machine manager determines whether the memory region is local to the virtual machine (block 403). If the memory region is not local, i.e., remote, then the virtual machine manager installs the memory region in a private region table associated with a core or chiplet on which the virtual machine executes (block 404). Alternatively, if an entry for the memory region already exists in the PRT and the VM caches a new cache line from the memory region, then the virtual machine manager increments the counter for the entry. Thereafter, operation ends (block 405). If the virtual machine manager determines that the memory region is local to the virtual machine in block 403, then operation ends (block 405).

Figure 5:
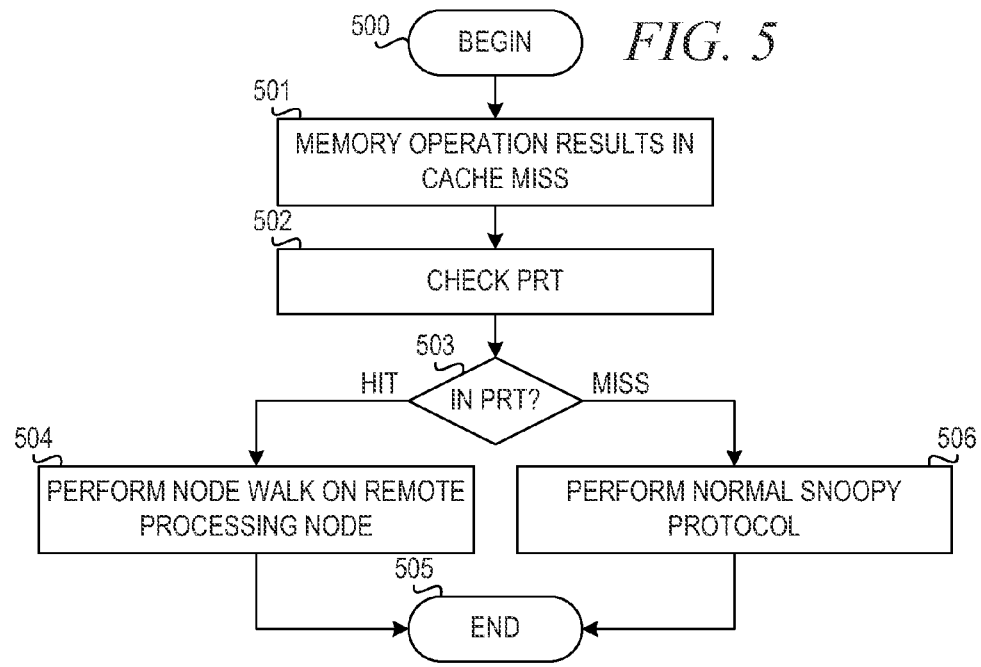
FIG. 5 is a flowchart illustrating operation for a mechanism for performing a memory operation based on a private region table in accordance with an illustrative embodiment.

FIG. 5 is a flowchart illustrating operation for a mechanism for performing a memory operation based on a private region table in accordance with an illustrative embodiment. Operation begins (block 500), and a memory operation results in a cache miss (block 501). The mechanism checks the private region table (PRT) (block 502) and determines whether the memory being accessed is in a memory region associated with an entry in the PRT (block 503). If the memory region is in the PRT (a PRT hit), then the mechanism performs a node walk on the remote node containing the memory region to perform the memory access (block 504). Thereafter, operation ends (block 505).

If the memory region is not in the PRT (a PRT miss) in block 503, then the mechanism performs the memory access using the normal snoopy protocol (block 506). The memory access using the normal snoopy protocol involves a "system pump" of the entire data processing system. Thereafter, operation ends (block 505).

Figure 6:
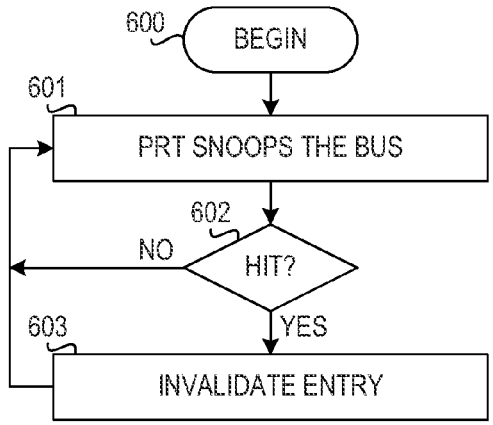
FIG. 6 is a flowchart illustrating operation of a mechanism for private region table snooping in accordance with an illustrative embodiment.

FIG. 6 is a flowchart illustrating operation of a mechanism for private region table snooping in accordance with an illustrative embodiment. Operation begins (block 600), and the PRT snoops the bus (block 601). The mechanism determines whether a hit occurs on the bus (block 602). A hit occurs if another processor or virtual machine accesses the memory region. If a hit does not occur in block 602, then operation returns to block 601 to snoop the bus.

If a hit occurs in block 602, then the mechanism invalidates the corresponding entry in the PRT (block 603). Thereafter, operation returns to block 601 to snoop the bus.

In an alternative embodiment, the mechanism may split an entry into parts and invalidate only a part of the memory region. For example, each entry may include a bitmask, wherein each bit in the bitmask indicates whether a portion of the memory region is valid or invalid. For example, the memory region may be a page, and the bitmask may include a bit for each cache line in the page. When all cache lines in the page are invalidated and all bits in the bitmask are asserted (or de-asserted depending upon the implementation), then the PRT entry can be invalidated.

Figure 7:
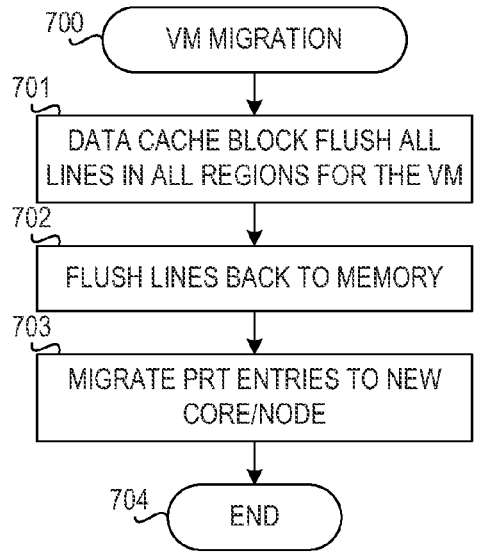
FIG. 7 is a flowchart illustrating operation of a mechanism for performing private region table entry migration through dynamic random access memory in accordance with an illustrative embodiment.

FIG. 7 is a flowchart illustrating operation of a mechanism for performing private region table entry migration through dynamic random access memory in accordance with an illustrative embodiment. Operation begins (block 700) when a virtual machine is migrated. The mechanism performs a data cache block flush of all cache lines in all regions for the virtual machine (block 701). The mechanism flushes the cache lines back to dynamic random access memory (DRAM) (block 702). The mechanism migrates PRT entries to the new core or node (block 703). Thereafter, operation ends (block 704).

Figure 8:
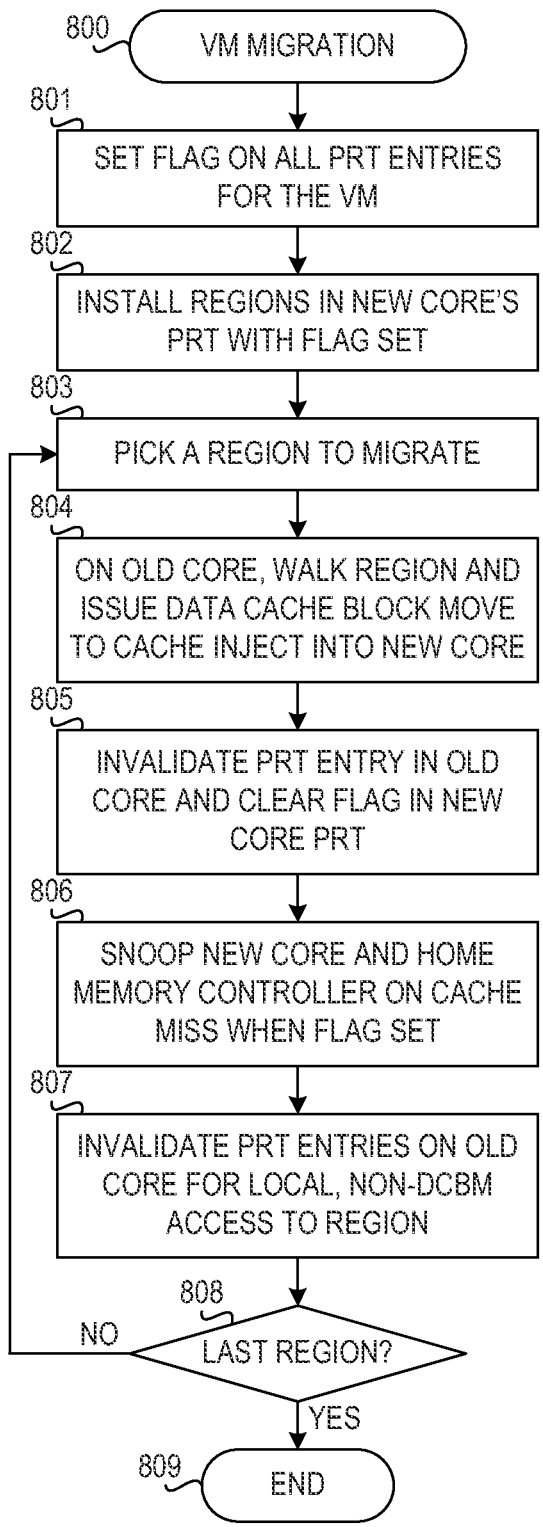
FIG. 8 is a flowchart illustrating operation of a mechanism for performing private region table entry migration from core to core in accordance with an illustrative embodiment.

FIG. 8 is a flowchart illustrating operation of a mechanism for performing private region table entry migration from core to core in accordance with an illustrative embodiment. Operation begins (block 800) when a virtual machine is migrated from one core to another core. The mechanism sets a flag on all PRT entries for the virtual machine (block 801). The mechanism installs regions in the PRT of the new core with the flag set (block 802).

Then, the mechanism picks a memory region to migrate (block 803). On the old core, the mechanism walks the region and issues a data cache block move (DCBM) to cache inject the data into the new core (block 804). The mechanism invalidates the PRT entry in the old core and clears the flag in the PRT of the new core (block 805). The mechanism snoops the new core and the home memory controller on cache miss when the flag is set (block 806). The mechanism then invalidates the PRT entries on the old core for local, non-DCBM access to the region (block 807).

Next, the mechanism determines whether the memory region is the last region in the PRT for the virtual machine being migrated (block 808). If the memory region is not the last region, then operation returns to block 803 to pick the next memory region. If the memory region is the last memory region in the PRT for the virtual machine being migrated in block 808, then operation ends (block 809).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The mechanisms of the illustrative embodiments provide hardware structures and software support to filter unnecessary snoops for remote data accessed by a virtual machine (VM). The mechanisms reduce coherence traffic for data that is private to the core or chip but located remotely. Cache misses for remote private memory avoid coherence and go directly to the remote memory controller. The hardware structures include a private region table (PRT). The mechanisms may include one PRT per chiplet or core and one chip-level PRT per chip. Each entry in the PRT corresponds to a remote region of memory that is private to a VM. The processing core performs directed remote memory access for these memory regions. The virtual machine manager (VMM) detects private remote memory and installs entries in the PRT. The VMM also maintains free pool invariant.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to:
   responsive to a memory operation from a processing core executing a virtual machine in a first processing node of the multiple processor system resulting in a cache miss, check a private region table associated with the processing core, wherein the memory operation attempts to access a memory region stored in memory of a second processing node of the multiple processor system;
   responsive to determining the memory region corresponds to an entry in the private region table and the memory region is node-contained in the second processing node, perform the memory operation on the second processing node without snooping the entire multiple processor system;
   responsive to migrating the virtual machine to a new processing core, migrating entries of the private region table to a private region table associated with the new processing core, wherein migrating entries of the private region table to the private region table associated with the new processing core comprises performing a data cache block flush of all cache lines in all regions for the virtual machine, and wherein migrating entries of the private region table to the private region table associated with the new processing core comprises:
   setting a flag on all private region table entries for the virtual machine;
   installing entries in the private region table associated with the new processing core for the memory regions allocated to the virtual machine;
   for each given memory region to migrate to the new processing core:
      walk the given memory region and issue a data cache block move to cache inject into the new processing core;
      invalidate a private region table entry for the given memory region in the private region table associated with the old processing core; and
      clear the flag in the corresponding entry in the private region table associated with the new processing core.

2. The computer program product of claim 1, wherein the computer readable program further causes the computing device to perform the memory operation using snoopy protocol responsive to determining the memory region does not correspond to an entry in the private region table.

3. The computer program product of claim 1, wherein the computer readable program further causes the computing device to perform the memory operation using snoopy protocol responsive to determining the memory region is not node-contained in the second processing node.

4. The computer program product of claim 1, wherein each entry of the private region table comprises a tag, a size, least recently used (LRU) information, and a count of cache lines stored in a cache of the processing core.

5. An apparatus comprising:
a processor; and
a memory coupled to the processor, wherein the memory comprises instructions which, when executed by the processor, cause the processor to:
responsive to a memory operation from a processing core executing a virtual machine in a first processing node of the multiple processor system resulting in a cache miss, check a private region table associated with the processing core, wherein the memory operation attempts to access a memory region stored in memory of a second processing node of the multiple processor system;
responsive to determining the memory region corresponds to an entry in the private region table and the memory region is node-contained in the second processing node, perform the memory operation on the second processing node without snooping the entire multiple processor system;
responsive to migrating the virtual machine to a new processing core, migrate entries of the private region table to a private region table associated with the new processing core, wherein migrating entries of the private region table to the private region table associated with the new processing core comprises performing a data cache block flush of all cache lines in all regions for the virtual machine, and wherein migrating entries of the private region table to the private region table associated with the new processing core comprises:
setting a flag on all private region table entries for the virtual machine;
installing entries in the private region table associated with the new processing core for the memory regions allocated to the virtual machine;
for each given memory region to migrate to the new processing core:
walk the given memory region and issue a data cache block move to cache inject into the new processing core;
invalidate a private region table entry for the given memory region in the private region table associated with the old processing core; and
clear the flag in the corresponding entry in the private region table associated with the new processing core.

6. The apparatus of claim 5, wherein the instructions further cause the processor to perform the memory operation using snoopy protocol responsive to determining the memory region does not correspond to an entry in the private region table.

7. The apparatus of claim 5, wherein the instructions further cause the processor to perform the memory operation using snoopy protocol responsive to determining the memory region is not node-contained in the second processing node.

8. The apparatus of claim 5, wherein each entry of the private region table comprises a tag, a size, least recently used (LRU) information, and a count of cache lines stored in a cache of the processing core.

9. The apparatus of claim 5, wherein the virtual machine executing on the processing core requests memory from a virtual machine manager, the virtual machine manager allocates a remote memory region to the virtual machine, and the virtual machine manager installs an entry in the private region table corresponding to the remote memory region.

10. A method for memory coherence in a multiple processor system, the method comprising:
responsive to a memory operation from a processing core executing a virtual machine in a first processing node of the multiple processor system resulting in a cache miss, checking a private region table associated with the processing core, wherein the memory operation attempts to access a memory region stored in memory of a second processing node of the multiple processor system;
responsive to determining the memory region corresponds to an entry in the private region table and the memory region is node-contained in the second processing node, performing the memory operation on the second processing node without snooping the entire multiple processor system;
responsive to migrating the virtual machine to a new processing core, migrating entries of the private region table to a private region table associated with the new processing core, wherein migrating entries of the private region table to the private region table associated with the new processing core comprises performing a data cache block flush of all cache lines in all regions for the virtual machine, and wherein migrating entries of the private region table to the private region table associated with the new processing core comprises:
setting a flag on all private region table entries for the virtual machine;
installing entries in the private region table associated with the new processing core for the memory regions allocated to the virtual machine;
for each given memory region to migrate to the new processing core:
walk the given memory region and issue a data cache block move to cache inject into the new processing core;
invalidate a private region table entry for the given memory region in the private region table associated with the old processing core; and
clear the flag in the corresponding entry in the private region table associated with the new processing core.

11. The method of claim 10, further comprising performing the memory operation using snoopy protocol responsive to determining the memory region does not correspond to an entry in the private region table.

12. The method of claim 10, further comprising performing the memory operation using snoopy protocol responsive to determining the memory region is not node-contained in the second processing node.

13. The method of claim 10, wherein each entry of the private region table comprises a tag, a size, least recently used (LRU) information, and a count of cache lines stored in a cache of the processing core.

14. The method of claim 10, wherein the virtual machine executing on the processing core requests memory from a virtual machine manager, the virtual machine manager allocates a remote memory region to the virtual machine, and the virtual machine manager installs an entry in the private region table corresponding to the remote memory region.

* * * * *